(12) United States Patent
Harris

(10) Patent No.: US 6,422,330 B1
(45) Date of Patent: Jul. 23, 2002

(54) SWITCH FOR USE IN RIDE-ON VEHICLES FOR CHILDREN

(75) Inventor: Timothy S. Harris, Fort Wayne, IN (US)

(73) Assignee: PIC Switches, Inc., Fort Wayne, IN (US)

( * ) Notice: Subject to any disclaimer, the term of this patent is extended or adjusted under 35 U.S.C. 154(b) by 0 days.

(21) Appl. No.: 09/412,032

(22) Filed: Oct. 4, 1999

(51) Int. Cl.[7] .............................. B62D 11/04; B60K 1/00
(52) U.S. Cl. ...................... 180/65.1; 180/6.5; 307/119; 200/241
(58) Field of Search ............................. 180/65.1, 65.3, 180/6.5, 20, 21; 200/241, 547, 551; 307/119

(56) References Cited

U.S. PATENT DOCUMENTS

| | | | |
|---|---|---|---|
| 3,493,696 A | | 2/1970 | Rothweiler |
| 3,818,293 A | | 6/1974 | Wood et al. |
| 3,996,440 A | | 12/1976 | Niconienko |
| 4,246,453 A | | 1/1981 | Marchese et al. |
| 4,378,855 A | | 4/1983 | Haub et al. |
| 4,401,866 A | | 8/1983 | Kaminski et al. |
| 4,562,893 A | | 1/1986 | Cunard |
| 4,572,931 A | | 2/1986 | Shiraishi et al. |
| 4,625,084 A | | 11/1986 | Fowler et al. |
| 4,639,646 A | | 1/1987 | Harris et al. |
| 4,916,263 A | | 4/1990 | Ichigo |
| 4,959,554 A | | 9/1990 | Underwood, IV et al. |
| 4,976,650 A | * | 12/1990 | Watanabe ............... 446/418 |
| 5,097,184 A | * | 3/1992 | Echtler et al. ........... 318/139 |
| 5,160,875 A | * | 11/1992 | Kono ...................... 318/280 |
| 5,173,591 A | | 12/1992 | Perego |
| 5,571,999 A | | 11/1996 | Harris |
| 5,644,114 A | * | 7/1997 | Neaves .................... 200/6 R |
| 5,859,509 A | * | 1/1999 | Bienz et al. ............. 318/139 |

FOREIGN PATENT DOCUMENTS

WO    WO93/15926    8/1993

* cited by examiner

Primary Examiner—Brian L. Johnson
Assistant Examiner—Bridget Avery
(74) Attorney, Agent, or Firm—Kolisch, Hartwell, Dickinson, McCormack & Heuser

(57) ABSTRACT

A switch for use in a ride-on vehicle for children. The switch includes plural contact sets operated by an actuator to control the speed and/or direction of the vehicle. In the disclosed embodiment, a separator structure blocks contact sets from closing when they should be open to prevent inadvertent shorting.

9 Claims, 3 Drawing Sheets

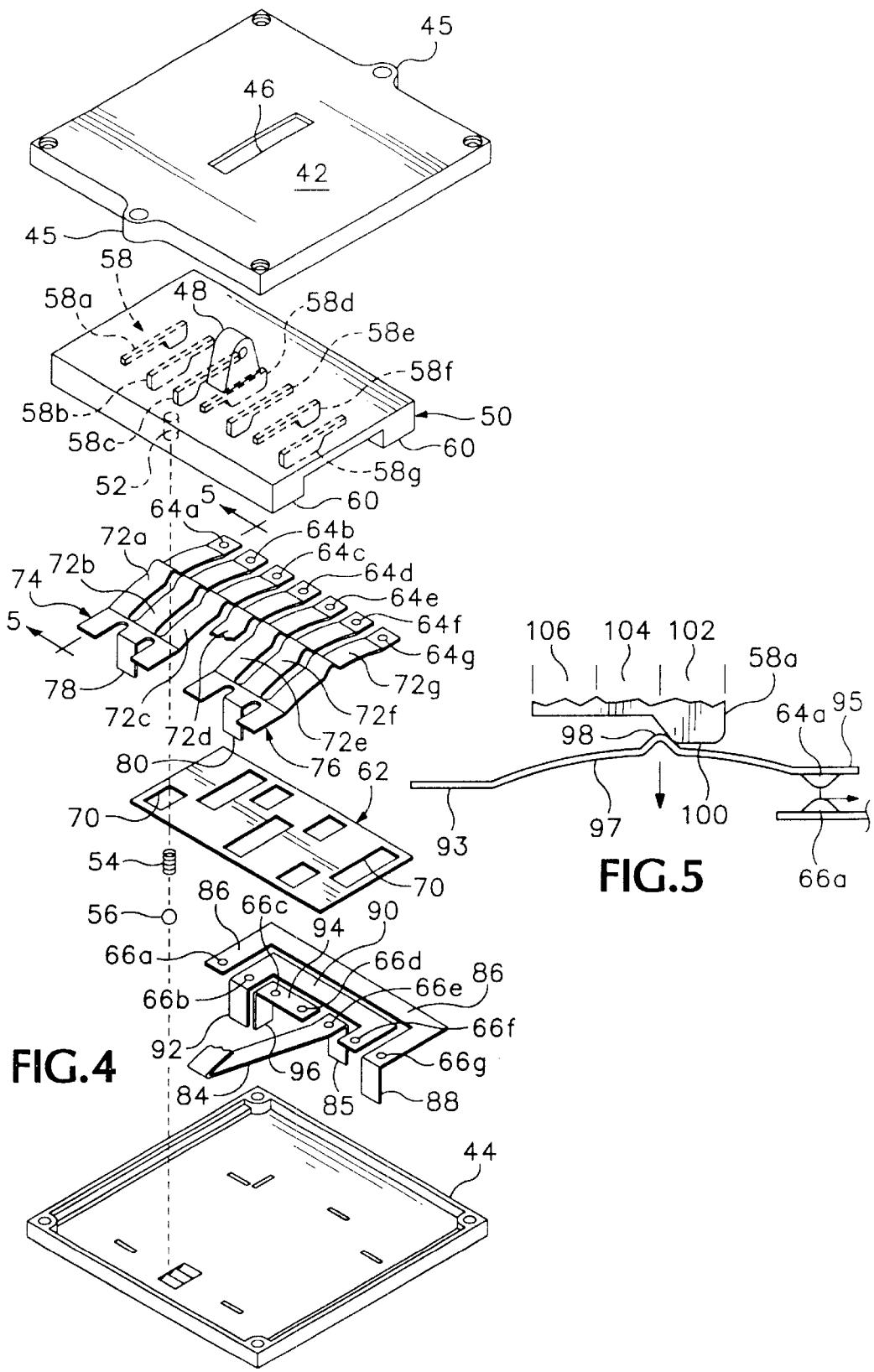

SWITCH FOR USE IN RIDE-ON VEHICLES FOR CHILDREN

FIELD OF THE INVENTION

This invention relates to switches and more particularly to a speed-control switch used in battery-powered ride-on vehicles for children.

BACKGROUND OF THE INVENTION

Small battery-powered ride-on vehicles are popular toys for children. These toy vehicles typically resemble their full-scale counterparts and allow children to experience the fun and excitement of driving. Ride-on vehicles are usually powered by one or two rechargeable sealed lead-acid batteries. The battery powers one or two small DC motors that drive the vehicle. By reversing the polarity between the battery and the motor the vehicle can be driven in forward and reverse. Moreover, in vehicles with two motors or two batteries, the motors and/or batteries can be switched between parallel and series electrical connections to adjust the speed of the vehicle.

To date, switches used to change speeds and or directions in existing ride-on vehicles have been unnecessarily complex and expensive. It is important to minimize cost to keep the toy affordable. Part of the cost and complexity of existing switches is driven by the importance of insuring that the switch does not short the battery when switching. This is critical because the batteries used in ride-on vehicles can produce currents of hundreds of amps in the event of a short. Such a current level is sufficient to melt the insulation on the wires and potentially start a fire. Therefore, the switch design should be as near as possible to foolproof to avoid an inadvertent short. At the same time, the switch should be relatively simple to make it economically viable for use in a toy ride-on vehicle.

BRIEF DESCRIPTION OF THE DRAWINGS

FIG. 4 is an exploded view of a switch constructed according to the present invention.

FIG. 5 is a sectional view along lines 5—5 of FIG. 4.

DETAILED DESCRIPTION

Figure 1:
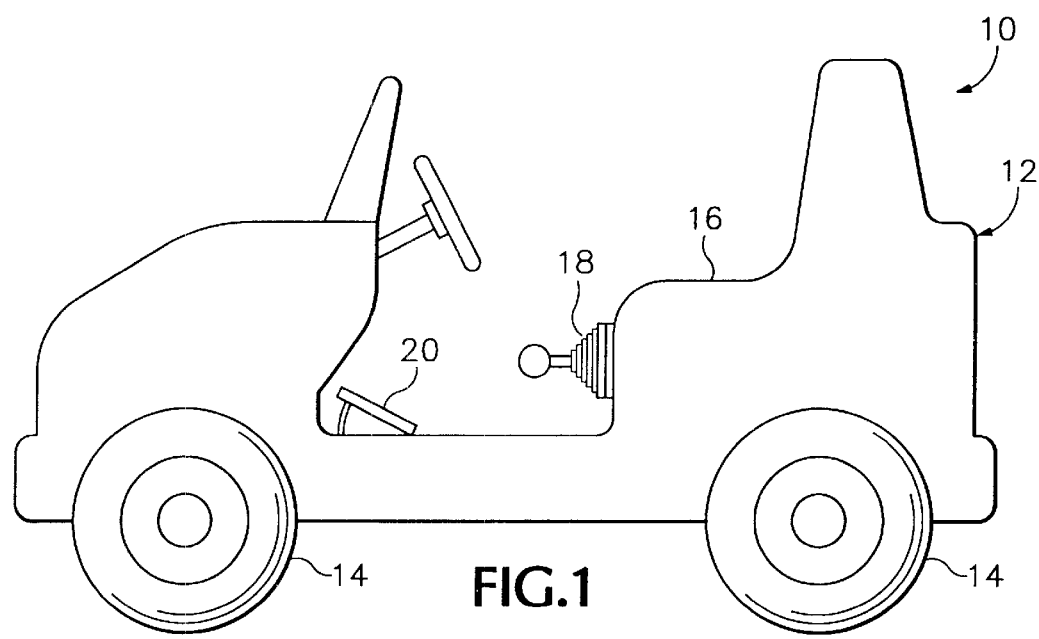
FIG. 1 shows a ride-on vehicle constructed according to the present invention.

A ride-on vehicle according to the present invention is shown generally at 10 in FIG. 1. Vehicle 10 includes a body 12 and wheels 14. The body includes a seat 16 on which a rider and passenger may sit. The rider operates a shifter 18 to control the speed and direction of the vehicle. With the shifter placed in a desired setting, the user controls operation of the vehicle by selectively pressing a foot pedal 20.

Figure 2:
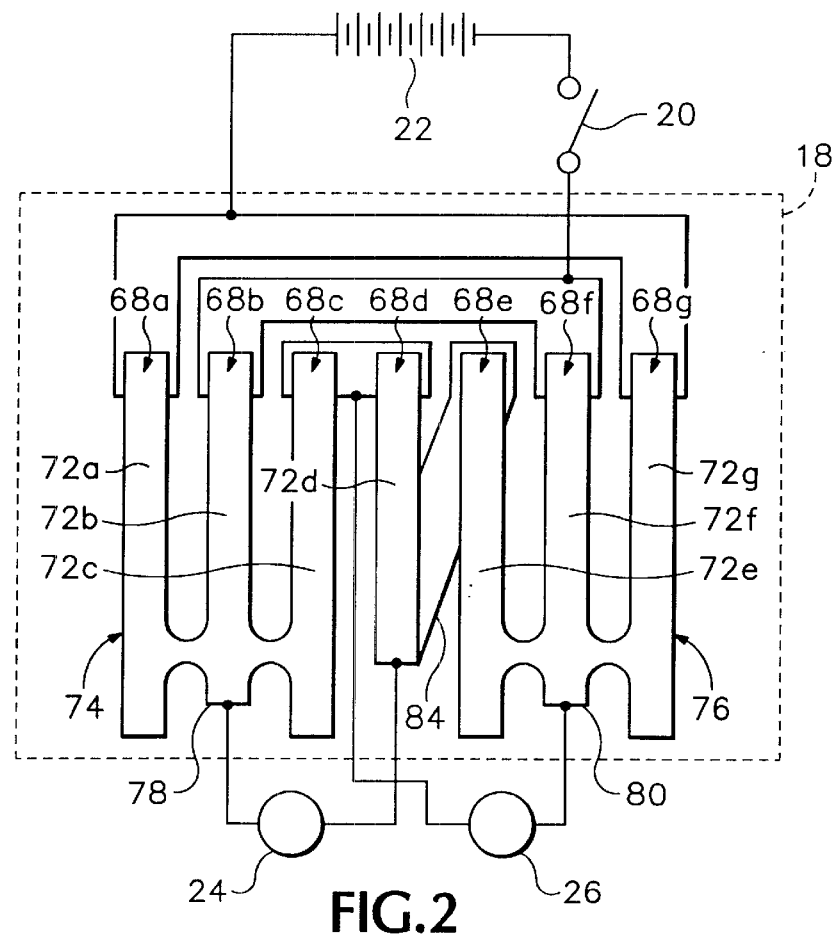
FIG. 2 is a schematic illustration of a power system of the vehicle of FIG. 1.

As shown schematically in FIG. 2, vehicle 10 includes a battery 22 and motors 24, 26. The shifter and foot pedal are disposed between the battery and motors to control the flow of power from the battery to the motors. In particular, shifter 18 is configured to selectively place the motors in series or parallel with each other to provide low and high speeds, respectively. Shifter 18 is also configured to reverse the polarity of the power supplied to the motors when they are placed in series to provide a low-speed reverse.

Figure 3:
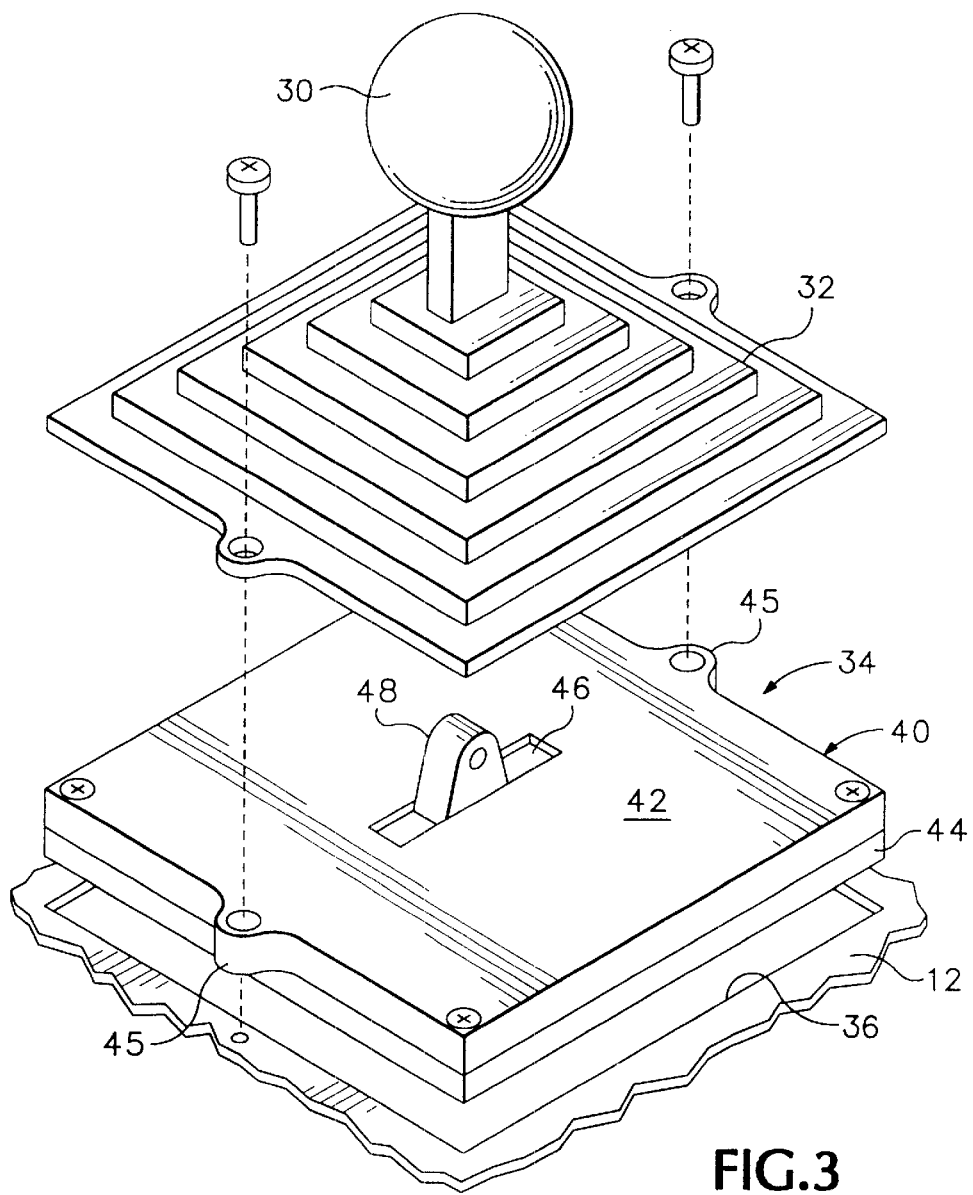
FIG. 3 shows a shifter constructed according to the present invention.
Figure 3:
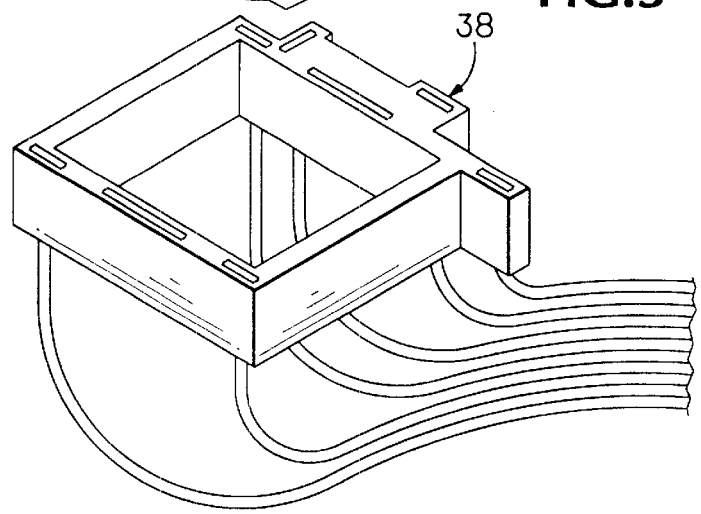

Shifter 18 includes a handle 30 and boot assembly 32 that attach to the top of a three-position switch. See FIG. 3. A switch 34 is secured in an opening 36 formed in body 12 for the purpose of mounting the shifter. A wiring harness 38 attaches to the bottom of switch 34 to carry current from the battery to the motors. It should be noted that harness 38 is asymmetric to prevent it from being attached to the switch incorrectly.

Switch 34 has a housing 40 with upper and lower sections 42, 44. Upper section 42 has tabs 45 at opposed ends thereof to facilitate attachment to the vehicle. A notch 46 is formed in upper section 42 to receive an upright 48 formed on the upper surface of an actuator in the form of a contact slider 50. The notch is sized to allow the slider to move back and forth within a predetermined range. Handle 30 is linked to upright 48 to shift the slider back and forth upon movement of the handle. A boss 52 is formed on the lower surface of the actuator to receive a spring 54 and detent ball 56. See FIG. 4. Key structure 58 including keys 58a–58g is also formed on the lower surface of the slider.

Side walls 60 depend downwardly from the lower surface of the slider to move a separator plate 62 with the slider. Separator plate 62 is disposed between moveable contacts 64a–g and fixed contacts 66a–g, the fixed and moveable contacts being oriented as opposed sets of contacts 68a–g. See FIGS. 2 and 4. The separator plate includes a series of openings 70 that serve to constrain which contact sets can be closed in any particular position of the slider.

Contacts 64a–c are mounted to corresponding spring contact fingers 72a–c, which are formed integrally as part of a spring contact plate 74. Similarly, contacts 64e–g are mounted to spring contact fingers 72e–g formed as part of a spring contact plate 76. Contact plates 74, 76 each include a terminal 78, 80, respectively, which is connected to a corresponding input lead of the left or right motor. It should be noted that one benefit of the described embodiment of the present invention is the relatively simple construction in which each of the contact plates is stamped from a single piece of sheet metal. Contact 64d is carried by a spring contact finger 72d formed integrally with a base contact finger 84. Fixed contact 66e is disposed on the end of base contact finger 84. A terminal 85 extends from the end of the base contact finger through the housing. Fixed contacts 66a, g are disposed on opposed ends of a C-shaped base contact plate 86. A terminal 88 extends through housing off of one end of contact plate 86. Similarly, fixed contacts 66b, f are disposed on opposed ends of a second C-shaped base contact plate 90, with a terminal 92 extending off one end thereof. Fixed contacts 66c, d are located on third base contact plate 94 that includes a terminal 96.

Terminals 88 and 92 are connected through the wiring harness to the positive and negative terminals of the battery. Terminals 85 and 96 are connected to the motors through the wiring harness. More specifically, as shown in FIG. 2, terminals 78 and 85 are connected to the left motor and terminals 80 and 96 are connected to the right motor.

Spring contact fingers 72a–g each includes a fixed end 93 and a free end 95, with the contacts being disposed on the free ends. See FIG. 5. A cantilever section 97 extends from the fixed end to the free end and provides sufficient flexibility to allow the contact sets to be opened and closed. In an unbiased configuration, the spring contact fingers are bent to separate the contacts.

Located in a medial section between the free and fixed ends is an actuator bump 98. This bump is engaged by the corresponding key on the bottom of the actuator to bias the contact finger toward the fixed contact. Each key includes a lower cam surface 100 adapted to engage a bump. The cam surface includes three regions, one for each of the three switch configurations. More specifically, for each configuration the cam surface on each key falls at a closed level or an open level. At the closed level, the cam surface associated with the contact finger pushes down on the bump sufficiently to bias the contact finger far enough to move the moveable contact against the fixed contact. At the open level, the spring contact finger is free to return to its unbiased configuration with the contacts separated.

A high-speed region 102 of each cam surface controls the operation of the contact sets in the high-speed configuration. In the high-speed configuration, the cam surface in the high-speed region on keys 58 *b, c, e* and *g* is formed at the closed level so that contact sets 68*b, c, e* and *g* are closed. The high-speed region of the remaining keys is formed at the open level so that the remaining contact sets are open. This configuration of the contact sets places the motors in parallel with the battery so that the power supplied to and speed of each motor is maximized.

A low-speed region 104 of each cam surface controls the operation of the contact sets in the low-speed configuration. The low-speed region of keys 58*b, d* and *g* are formed at the closed level to close corresponding contact sets 68*b, d,* and *g*. With the remaining contact sets open, this arrangement of contact sets places the motors in series with each other so that approximately half of the battery voltage is applied to each motor.

A reverse region 106 of each cam surface controls which contact sets are closed in the reverse configuration. In particular, the reverse region of cam surfaces 58*a, d* and *f* are formed at the closed level to cause corresponding contact sets 68*a, d* and *f* to close. This pattern of contact set states places the motors in series with each other with the polarity reversed relative to the low-speed configuration. Thus, a low-speed reverse is generated.

A transition zone provides a smooth connection where the cam surface shifts between closed and open levels. As the key slides over the spring contact finger, the transition zone helps to provide a smooth changeover between the open and closed states of the associated contact set. It should be noted that as a cam surface pushes down on a contact finger, the finger first bends toward the fixed contact. However, after contact occurs, the action of the cam surface on the contact finger tends to straighten the finger slightly. The straightening action causes the contacts to slide somewhat as switching occurs, thereby reducing the chance of contacts becoming welded.

As the slider is moved between its various positions, the separator plate openings allow only those contact sets that should be closed to close. The pattern of openings in the separator plate corresponds to the pattern of the cam surface on the various keys used to close the contacts. The separator plate physically blocks those contacts that should not be closed from contacting each other. Moreover, in the event that a particular contact set becomes welded, the edge of a separator plate opening will catch on the contacts and either break the weld or prevent the slider from moving. This arrangement provides an added measure of security against inadvertent shorting of the battery. Preferably, the contact separator is formed of a durable, heat-resistant material to insure that its function is not degraded by repeated switching cycles.

It should be noted that the described embodiment provides the required electrical connectivity in a very simple package. For instance, no external jumpers or associated extra terminals are required as would be necessary if a general purpose switch were used. The connections that would normally be required are built into the internal contact arrangement of the disclosed embodiment, thereby minimizing the cost and complexity of the switch.

While the invention has been disclosed in its preferred form, the specific embodiments thereof as disclosed and illustrated herein are not to be considered in a limiting sense as numerous variations are possible. Applicant regards the subject matter of his invention to include all novel and non-obvious combinations and subcombinations of the various elements, features, functions and/or properties disclosed herein. No single feature, function, element or property of the disclosed embodiments is essential. The following claims define certain combinations and subcombinations which are regarded as novel and non-obvious. Other combinations and subcombinations of features, functions, elements and/or properties may be claimed through amendment of the present claims or presentation of new claims in this or a related application. Such claims, whether they are broader, narrower or equal in scope to the original claims, or even directed to inventions independent of the original claims, are also regarded as included within the subject matter of applicant's invention.

I claim:

1. A ride-on vehicle for a child, comprising:
    a body adapted to support a rider;
    at least two wheels mounted to the body to support the body;
    an electric motor connected with at least one of the wheels, the motor being configured to rotate at least one of the wheels upon operation;
    a battery electrically connected to selectively supply power to operate the motor;
    a switch disposed in electrical connection between the motor and the battery, the switch being selectively actuable between a first configuration and a second configuration and including a plurality of contact sets, each contact set having associated contacts which can be opened or closed, where at least a selected one of the contact sets is open in the first configuration and closed in the second configuration, the switch further including a contact separator structure, the contact separator structure including a portion which is interposed between the contacts on the selected one of the contact sets when the switch is in the first configuration to block the contacts from closing while the switch is in the first configuration; and
    wherein at least one of the contacts of at least one of the contact sets is mounted on a spring contact finger, and the switch further includes an actuator configured to bias the spring contact finger to close the corresponding contact set, where the actuator biasing the spring contact finger to close the contact set generates a sliding action between the contacts being closed.

2. The vehicle of claim 1, wherein the contact separator structure is configured to prevent the switch from transitioning to the first configuration until the selected one of the contact sets opens.

3. The vehicle of claim 1, where in the first configuration, power is delivered to the motor with a first polarity and in the second configuration power is delivered to the motor with reverse polarity.

4. The vehicle of claim 1, where a first subset of the plurality of contact sets are open when the switch is in the first configuration, and wherein the contact separator structure includes portions interposed between the contacts in at least some of the contact sets in the first subset when the switch is in the first configuration to block the corresponding contacts in the first subset from closing when the switch is in the first configuration.

5. The vehicle of claim 1, further including a second electric motor connected with at least one of the wheels, the motor being configured to rotate the wheel upon operation, wherein in the first configuration the motors are connected with a first polarity in parallel to the battery and in the second configuration the motors are connected with a second polarity in series to the battery.

6. The vehicle of claim 1, wherein at least some of the contact sets include a moveable contact mounted on a spring contact finger, and where at least two of the spring contact fingers are formed as part of an electrically continuous spring contact plate.

7. The vehicle of claim 1, wherein at least some of the contact sets include a fixed contact and a moveable contact, and where a moveable contact of one such contact set is formed in electrical connection with a fixed contact of another such contact set.

8. The vehicle of claim 1, further comprising a second motor configured to rotate at least one of the wheels, wherein the switch is configured to selectively connect the motors in series or parallel relative to the battery.

9. The vehicle of claim 8, wherein the switch is configured to selective reverse the polarity of current flow to the motors.

* * * * *